US006898547B1

(12) United States Patent
DeBlois et al.

(10) Patent No.: US 6,898,547 B1
(45) Date of Patent: May 24, 2005

(54) ROTOR ASSEMBLY SYSTEM AND METHOD

(75) Inventors: J. Holly DeBlois, Gloucester, MA (US); Robert M. Lee, Magnolia, MA (US)

(73) Assignee: Axiam, Incorporated, Gloucester, MA (US)

(*) Notice: Subject to any disclaimer, the term of this patent is extended or adjusted under 35 U.S.C. 154(b) by 163 days.

(21) Appl. No.: 09/950,942

(22) Filed: Sep. 11, 2001

Related U.S. Application Data

(60) Provisional application No. 60/231,820, filed on Sep. 11, 2000.

(51) Int. Cl.[7] .......................... G01D 1/00; G06F 15/00; G06M 11/04

(52) U.S. Cl. .......................... 702/127; 702/34; 702/42; 702/54; 702/56; 702/183; 702/185; 477/30; 477/53; 477/56; 701/33; 701/49; 701/100; 356/124; 356/73; 73/117.3; 382/115; 700/159; 700/182

(58) Field of Search ............................ 702/34, 42, 54, 702/56, 127, 183, 185; 356/124, 73; 73/117.3; 705/26, 27, 28; 477/30, 53, 56; 701/33, 49, 100; 382/115; 700/159, 182; 703/1

(56) References Cited

U.S. PATENT DOCUMENTS

| | | | | | |
|---|---|---|---|---|---|
| 4,131,387 | A | * 12/1978 | Kazin et al. | ................ | 415/119 |
| 5,373,922 | A | * 12/1994 | Marra | ........................ | 188/379 |
| 5,564,656 | A | * 10/1996 | Gilbert | ....................... | 244/217 |
| 5,689,435 | A | * 11/1997 | Umney et al. | ................. | 703/1 |
| 5,768,149 | A | * 6/1998 | Umney et al. | ................. | 703/1 |
| 5,821,412 | A | * 10/1998 | Bryant et al. | .............. | 73/117.3 |
| 6,452,179 | B1 | * 9/2002 | Coates et al. | .......... | 250/339.09 |
| 6,473,794 | B1 | * 10/2002 | Guheen et al. | ............. | 709/223 |
| 6,519,571 | B1 | * 2/2003 | Guheen et al. | ............... | 705/14 |
| 2002/0122583 | A1 | * 9/2002 | Thompson | .................. | 382/141 |

OTHER PUBLICATIONS

Axiam Incorporated Product Brochure of GMX 4000 Smart Stack™ Systems, "For Assembly of Aircraft Jet Engines and Industrial Gas Turbines", (1991).

Axiam Incorporated Product Brochure of Axiam's Rotor Assembly Process, Tools & Training, "Bild Engine Rotors Within Compliance Reduce Turn Time, Decrease Vibration And Cut Costs" (1991).

* cited by examiner

*Primary Examiner*—John Barlow
*Assistant Examiner*—Aditya S Bhat
(74) *Attorney, Agent, or Firm*—Hamilton, Brook, Smith & Reynolds, P.C.

(57) ABSTRACT

A system is disclosed for use in assembling a plurality of rotatable elements in the assembly of a turbine engine. The system includes an initialization unit, a measurement unit, and a processing unit. The initialization unit is for entering initialization data into a database. The initialization data includes a first set of initialization data that is representative of characteristics of a first rotatable element, and a second set of initialization data that is representative of characteristics of a second rotatable element. The measurement unit is for permitting a user to enter measured data including a first set of measured data characteristic of measured features of the first rotatable element, and a second set of measured data characteristic of measured features of the second rotatable element. The processor unit is for determining an optimal order and rotational arrangement of the first and second rotatable elements with respect to one another responsive to the first and second sets of initialization data and the first and second sets of measured data.

25 Claims, 5 Drawing Sheets

ROTOR ASSEMBLY SYSTEM AND METHOD

This application claims priority to U.S. Provisional Application Serial No. 60/231,820 filed on Sep. 11, 2000.

BACKGROUND OF THE INVENTION

The invention relates to the production and assembly of engines, and relates in particular to systems and methods for assembling rotors in gas turbine engines.

A configuration of the modules of a typical gas turbine engine include a low pressure compressor 10, a high pressure compressor 12, a high pressure turbine 14, and a low pressure turbine 16. During operation of the engine system of the invention as shown in FIG. 1. During operation, air flows into the low pressure compressor 10, then to the high pressure compressor 12, through the high pressure turbine 14, and lastly through the low pressure turbine 16. A first shaft 18 connects the low pressure compressor 12 to the low pressure turbine 16, and a second concentric shaft 20 of larger diameter connects the high pressure compressor 14 to the high pressure turbine 14. The shaft 20 spins faster (in revolutions per minute) than the smaller diameter shaft 18. The blades that are inserted on the respective rotors vary in size. The blades on the rotors of the faster shaft 20 are smaller and produce less thrust than the blades on the rotors of the slower shaft 18. The spacing between the concentric shafts 18 and 20 is maintained with bearings and journals.

As shown in FIG. 2, a typical conventional procedure for assembling each module of an engine begins (step 200) by providing the rotatable parts for assembly (step 202). The rotatable parts are then measured using a conventional measuring system, such as Coordinate Measuring Machine, or CMM (step 204). From the measurements of the parts, the angle of maximum runout, or the maximum unbalance point, of each part is used to orient the component parts in a rotor assembly stacking, and a runout table is consulted to identify the largest deviation from flatness of each component part (step 206). When the components are stacked, the points of maximum unbalance, runout or flatness deviation, are alternately offset by 90 or 180 degrees in an attempt to build a straight rotor (step 208). Runout measurements are then taken with a dial indicator of an assembled stack on tooling supplied by an engine manufacturer (step 210). If the runout is not within tolerance (step 212), then the rotor is disassembled (step 214), and the problem is diagnosed (step 216). A revised plan is then developed to build the rotor (step 218) and the system returns to step 210. If the runout is within tolerance (step 212), then the rotor is placed in an engine, and the engine is moved to a test cell where its performance is tested (step 220). If the engine performance meets the defined criteria, then the system ends (step 222). If the engine performance does not meet the defined criteria, then the system returns to step 216 and diagnoses the problem.

This iterative process may require several days or weeks to build the modules of an engine that meets the specified deviation and an engine that meets the specified performance tolerances.

There is a need for a system and method for assembling rotors in a turbine engine that more efficiently and economically achieves an engine that meets any specified deviation and performance tolerances.

SUMMARY OF THE INVENTION

The invention provides a system for use in assembling a plurality of rotatable elements in the assembly of a turbine engine. The system includes an initialization unit, a measurement unit, and a processing unit. The initialization unit is for entering initialization data into a database. The initialization data includes a first set of initialization data that is representative of characteristics of a first rotatable element, and a second set of initialization data that is representative of characteristics of a second rotatable element. The measurement unit is for permitting a user to enter measured data including a first set of measured data characteristic of measured features of the first rotatable element, and a second set of measured data characteristic of measured features of the second rotatable element. The processor unit is for determining an optimal order and rotational arrangement of the first and second rotatable elements with respect to one another responsive to the first and second sets of initialization data and the first and second sets of measured data.

BRIEF DESCRIPTION OF THE DRAWINGS

The following description may be further understood with reference to the accompanying drawings in which.

The drawings are shown for illustrative purposes only, and are not to scale.

DETAILED DESCRIPTION OF THE INVENTION

Figure 1:
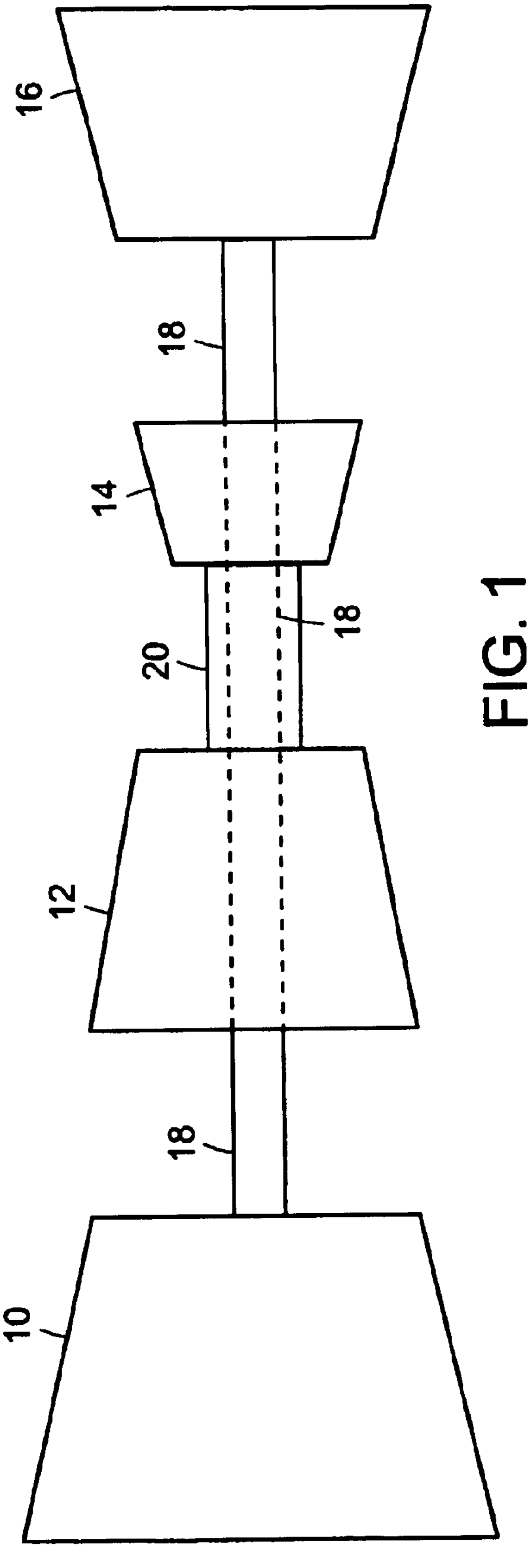
FIG. 1 PRIOR ART
FIG. 1 shows a diagrammatic illustration of a typical prior art gas turbine engine.
Figure 2:
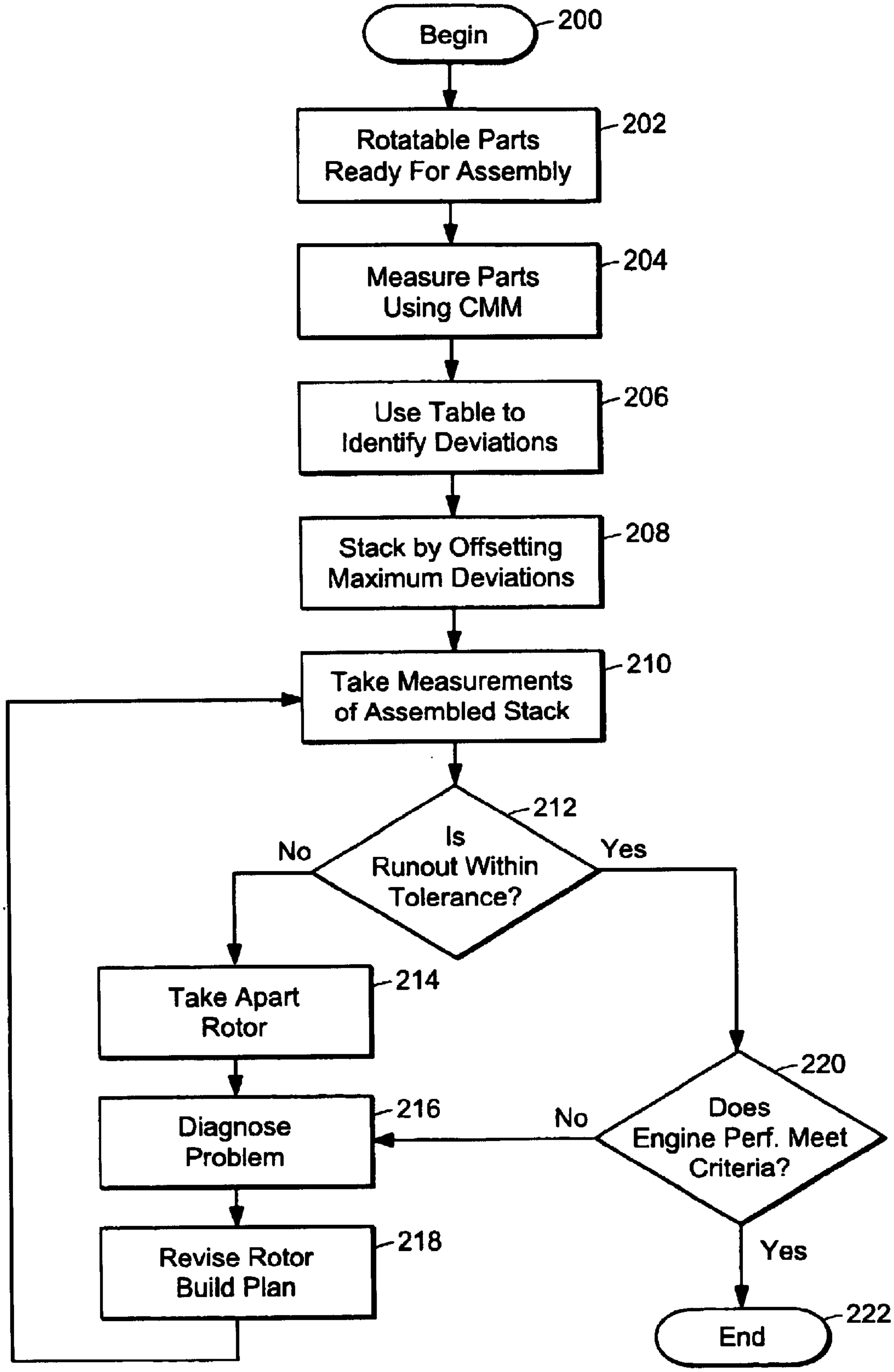
FIG. 2 PRIOR ART
FIG. 2 shows an illustrative flow chart showing a prior art procedure for assembling rotors in a gas turbine engine such as that shown in FIG. 1.
Figure 3:
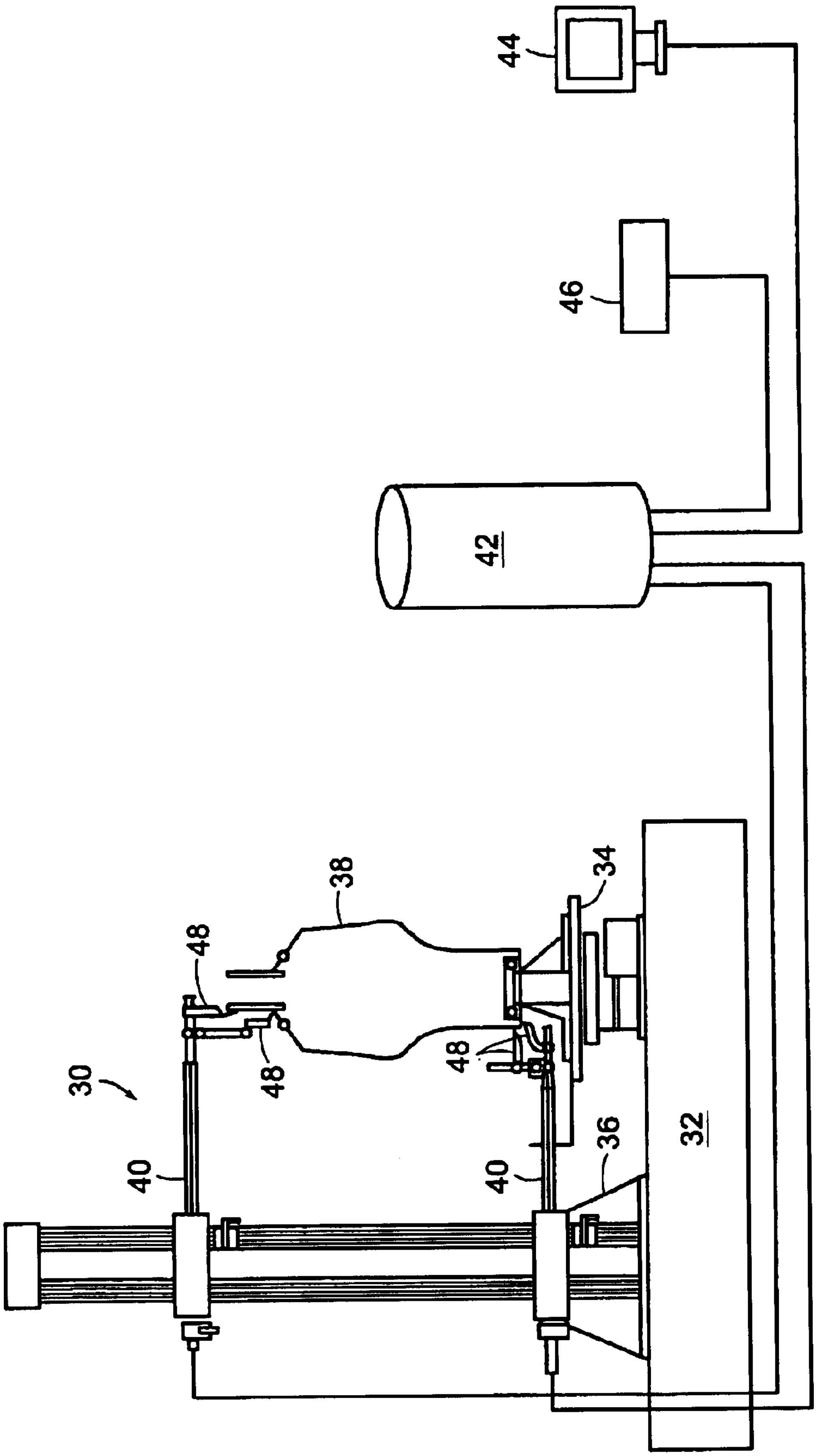
FIG. 3 shows a system for assembling rotor modules in accordance with an embodiment of the invention.

As shown in FIG. 3, a system of the invention includes a gage measurement system 30 that is accurate to 1 micron. The gage measurement system 30 includes a granite base 32 on which a precision rotary table 34 and tower 36 are mounted. An assembled rotor 38 is shown on the rotary table 34. As the rotor 38 spins, at for example three revolutions per minute, the measurement arms 40 of the tower 36 permit various characteristics of the rotors to be measured. Output from the measurement arms 40 is input to a data processor and storage unit 42. As the rotor spins, the data processor 42 determines whether the runout of the rotor is within tolerance responsive to the outputs of the measurement arms 40. The rotary table 34 may include a module—specific metal holding fixture for rotor component parts as well as a completely assembled rotor. The system collects the measurement data from probes 48 positioned on the measurement arms, and all data is displayed in a variety of screen formats that are available from the monitor 44 or the printer 46.

Figure 4:
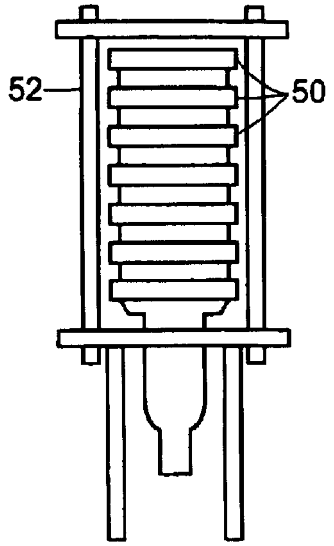
FIG. 4 shows an illustrative view of an optimally stacked rotor module in accordance with an embodiment of the invention.

As shown in FIG. 4, the rotor components 50 may be assembled and compressed with hydraulic pressure in a tool 52 to yield an optimized assembled rotor stack in accordance with an embodiment of the invention.

Figure 5:
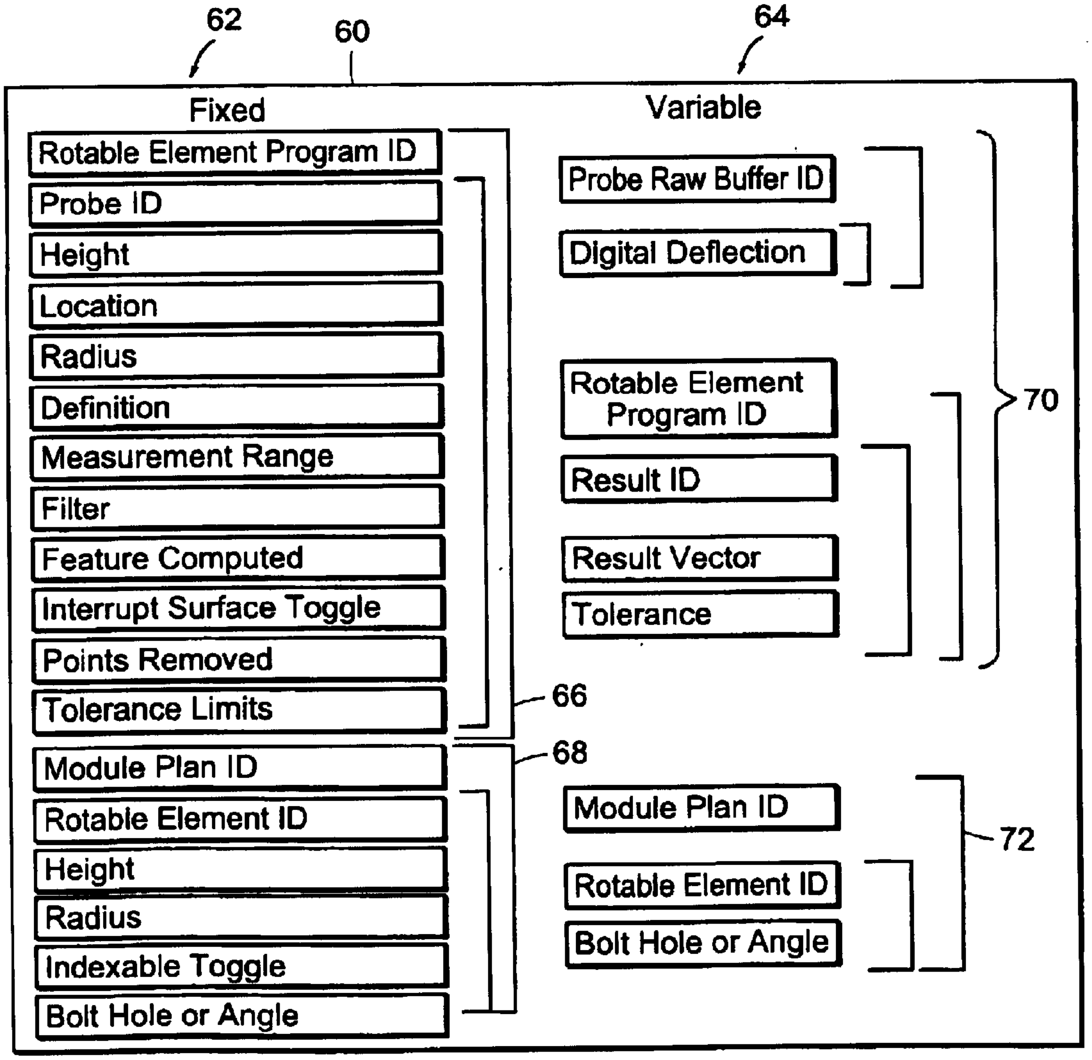
FIG. 5 shows an illustrative data record showing fixed and variable fields in accordance with an embodiment of the invention.

As shown in FIG. 5, the data record 60 used in the operation of a system of the invention include fixed data fields 62 and variable data fields 64. The fixed data will be entered by an operator or may be fixed at the factor. There are two stages of fixed data required in order to operate the present system. These include fixed data for making measurements of a single rotatable element 66 and fixed data for making optimal assembly stacking of the particular module 68.

The fixed data for the measurement of a particular rotatable element 66 includes twelve data fields as discussed below. Since measurements are calculated from data, there are a number of different ways to measure the data, so an operator or supervisor must establish a series of programs for measuring each rotatable element. The fixed data provides the fixed data that is required for the first program for the first rotatable element.

In particular, each measurement of a rotatable element requires the setup of between one and four probes that are positioned near the surface of the element, whose deflection will indicate the data of the measurement. The fixed data for each probe will differ. The eleven fields of fixed data beginning with an identifier for the probe called Probe ID (74) will be repeated for each probe used in a particular program. In addition to Probe ID, the fixed fields for each probe include Height, Location, Radius, Definition, Measurement Range, Filter, Feature Computed, Interrupt Surface Toggle, and Points Removed. The Height data field provides the height of the probe from the top of the rotating table (measured in the appropriate units that have been specified at system startup). The Location field provides the location of the probe in degrees of position (from counterclockwise looking down from above) from the starting position (or zed position) marked on the rotating table. The Radius field provides the horizontal distance of the probe from the center of the vertical projection of the rotating table. The Definition field provides the classification of the role of that probe in the particular measurement program. Datum probes set up the base axes, and probes may be positioned to measure the bottom, top or side faces of the rotatable element. A side face measuring probe will also be positioned to measure an outside diameter (OD) or an inside diameter (ID) depending upon the particular side surface selected. The Measurement Range field provides the gain selected for the amplification of the measurement signal. The Filter data field provides the filtering mode selected for the measurement. The Features Computer field provides the geometric method selected to calculate the center of the circle described by the measured data. The Interrupt Surface Toggle provides information regarding whether the rotatable element has an interrupted surface such as a groove that will not be measured. The Points Removed field provides information regarding whether there are specified tolerance limits to be flagged if exceeded.

The fixed data for each measurement program will differ and will be specified for each rotatable element. The twelve fields of fixed data 66 discussed above will be repeated for each rotatable element in the particular measurement program. In certain embodiments, all fields for each measurement program may be repeated as required.

The fixed data for making optimal assembly stacking of the particular module 68 includes six fields of data for the optimal assembly stacking of a particular module. The fixed data for each assembly stacking plan, which is specified by the identifier in the first field called Module Plan ID, will differ depending upon which rotatable elements are allowed to be indexed, or turned in alternative ways). The five remaining fields of fixed data for a module include Rotatable Element ID, Height, Radius, Indexable Toggle, and Bolt Hole Angle, and these fields will be repeated for each rotatable used in the particular plan. The six fields of fixed data for each assembly-stacking plan will be repeated for each plan. The Height field, the Radius field, the Indexable Toggle field, and the Bolt Hole Angle field are inserted at the factory.

The variable data 64 include two stages: the variable data fields filled in with the output of the measurement process 70, and the variable data fields filled in with the output of the assembly stacking optimization 72. The flow of data through the system is such that some of the outputs of the measurement process are required as inputs for the assembly stacking process.

The variable data for the measurement process 70 includes two sets of fields. The first set includes the Probe Raw Buffer ID field and the Digital Deflection field, both of which relate to collection data. The second set includes the Rotatable Element ID field, the Result ID field, the Result Vector field, and the Tolerance field, each of which relate to calculated data. For the collection data in the first set, the system stores the measured deflections in the Digital Deflections field for each particular probe. A measurement of the deflection of each probe is made for each measurement point that is established on the measurement path. Thus the Digital Deflection field is repeatedly collected for each measurement position.

For each probe used in the collection of data, there is a separate function (called a buffer) for storing the data collected for the thousands of data points. A buffer of data is collected for each probe specified for each rotatable element specified for each program. For the calculated data, beginning with a particular result, the system calculates the magnitude and angle of the result vector and its tolerance deviation. This data is stored in the Result Vector field and the Tolerance field respectively. The result data, which includes some standard results and some special results, is stored separately for each result but not for each probe. The data from all probes for a particular rotatable element is used together in the calculation of each result, which is repeated for each rotatable element. Result data for each rotatable element is also stored separately for each measurement program.

The assembly stacking optimization output data fields 72 includes the Module Plan ID field, the Rotatable Element ID field, and the Bolt Hole or Angle field. The Bolt Hole or Angle field is critical to the optimization description, and specifies the bolt hole or angle that is selected by the program as the best location for the paricular rotatable element relative to the zed position of the rotating table under the assembly stack. The specified bolt hole or angle data for all rotatable elements in one module plan gives the optimal stacking for that plan. The data is then repeated for each module plan as shown in FIG. 5.

Figure 6:
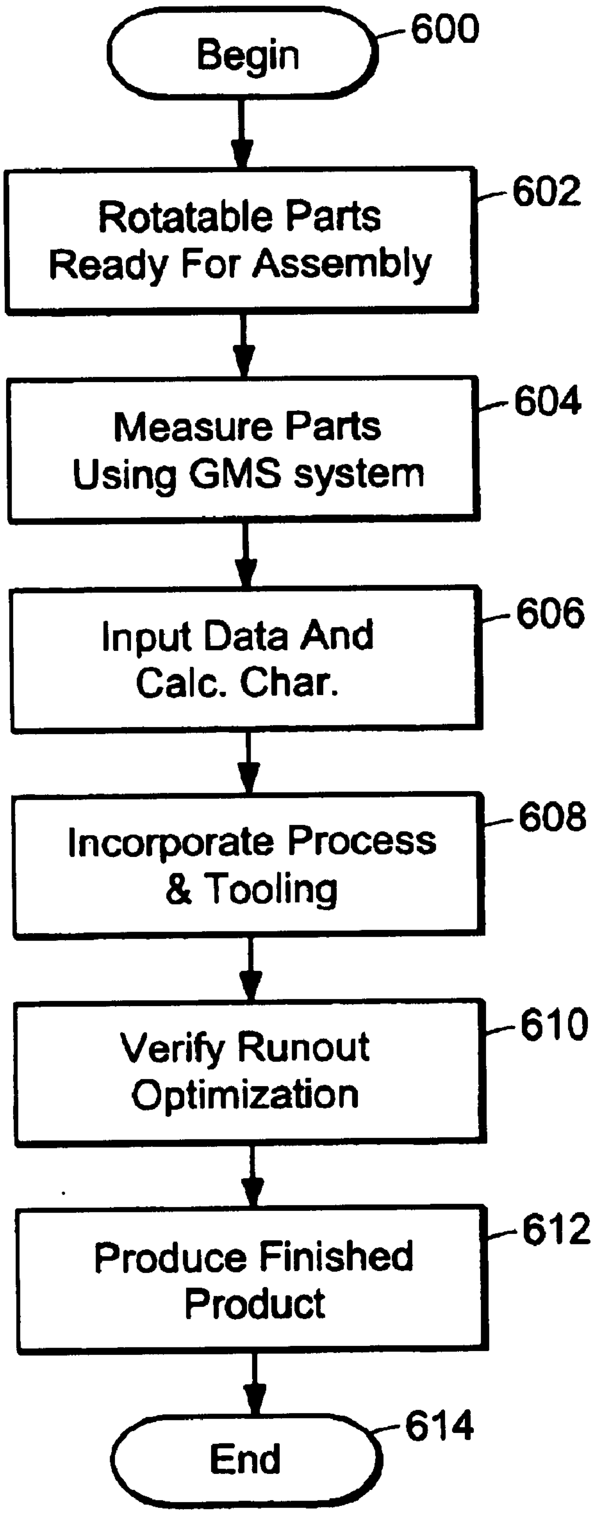
FIG. 6 shows an illustrative flow chart showing a method for assembling rotors in a gas turbine engine in accordance with embodiment of the invention.

As shown in FIG. 6, in system for building a rotor stack in accordance with an embodiment of the invention begins (step 600) by providing the rotatable parts for assembly (step 602). This step involves initializing the system that operates in data processor 42 by entering fixed initialization data into the system that is representative of characteristics of a rotatable element. The parts are then measured using a gage measurement system to accurately measure the rotor component parts (step 604). The measurement data provides the variable measured data that is then imported into the data processor 42, and is used by the data processor 42 to calculate the component part feature characteristics for use in the stacking model (step 606). This calculated data is then used to generate and predict an optimal order and rotational arrangement of the rotatable elements with respect to one another to provide an optimized rotor stack based on the fixed and measured data (step 608). In particular, the stack plan is compared to the desired tolerances to ensure that it would be within specification compliance, and heating/cooling techniques are employed and the rotor component parts are assembled on tools using hydraulic pressure in accordance with an acceptable module building plan. Runout optimization and compliance are then verified (step 612), and the program ends (step 614). The assembly of each rotor module is, therefore, predicable in terms of time to build,m cost and quality.

Those skilled in the art will appreciate that numerous modifications and variations may be made to the above disclosed embodiments without departing from the spirit and scope of the present invention.

What is claimed is:

1. A system for use in assembling a plurality of modules, each module including a plurality of rotatable elements in the assembly of a turbine engine, said system comprising:
  module assembly means comprising:
    initialization means for entering initialization data into a database, said initialization data including a first set of initialization data that includes data that is representative of a design characteristic of a first rotatable element, and a second set of initialization data that is representative of a design characteristic of a second rotatable element;
    measurement means for permitting a user to enter measured data including a first set of measured data that includes data that is representative of a measured characteristic of the first rotatable element, and a second set of measured data that includes data that is representative of a measured characteristic of the second rotatable element; and
    processor means for determining an optimal rotational arrangement of the first and second rotatable elements with respect to one another responsive to said first and second sets of initialization data and said first and second sets of measured data;
  module-to-module assembly means comprising:
    verification means for verifying measured characteristics of at least two assembled modules; and
    assembly parameter means for assembling the at least two modules of the turbine engine.

2. A system as claimed in claim 1, wherein said first set of initialization data further includes data representative of a diameter of the first rotatable element.

3. A system as claimed in claim 1, wherein said first set of initialization data further includes data representative of a face surface of the first rotatable element.

4. A system as claimed in claim 1, wherein said first set of measured data further includes data representative of a radius of the first rotatable element.

5. A system for use in assembling a plurality of modules, each module including a plurality of modules, each module including a plurality of rotatable elements in the assembly of a turbine engine, said system comprising:
  module assembly means comprising:
    initialization means for entering initialization data into a database, said initialization data including a first set of initialization data that includes data that is representative of a geometric characteristic of a first rotatable element, and a second set of initialization data that is representative of a geometric characteristic of a second rotatable element;
    measurement means for permitting a user to enter measured data including a first set of measured data that includes data that is representative of a measured geometric characteristic of the first rotatable element, and a second set of measured data that includes data that is representative of a measured geometric characteristic of the second rotatable element; and
    processor means for determining an optimal order of the first and second rotatable elements with respect to one another responsive to said first and second sets of initialization data and said first and second sets of measured data;
  module-to-module assembly means comprising:
    verification means for verifying measured geometric characteristics of at least two assembled modules; and assembly parameter means for assembling the at least two modules of the turbine engine.

6. A system as claimed in claim 5, wherein said first set of measured data further includes data representative of a height of the first rotatable element.

7. A system as claimed in claim 5, wherein said first set of measured data further includes data representative of a radius of the first rotatable element.

8. A system as claimed in claim 5, wherein said first set of measured data further includes data representative of a face surface of the first rotatable element.

9. A system for use in assembling a plurality of modules, each module including a plurality of rotatable elements in the assembly of a turbine engine, said system comprising:
  module assembly means comprising:
    initialization means for entering initialization data into a database, said initialization data including a first set of initialization data that includes data that is representative of a design characteristic of a first rotatable element, a second set of initialization data that is representative of a design characteristic of a second rotatable element, and a third set of initialization data that is representative of a design characteristic of a third rotatable element;
    measurement means for permitting a user to enter measured data including a first set of measured data that includes data that is representative of a measured characteristic of the first rotatable element, a second set of measured data that includes data that is representative of a measured characteristic of the second rotatable element, and a third set of measured data that includes data that is representative of a measured characteristic of the second rotatable element; and
    processor means for determining an optimal order of the first, second and third rotatable elements with respect to one another responsive to said first, second and third sets of initialization data and said first, second and third sets of measured data;
  module-to-module assembly means comprising:
    verification means for verifying measured design characteristics of at least two assembled modules; and
    assembly parameter means for assembling the at least two modules of the turbine engine.

10. A system as claimed in claim 9, wherein said first set of measured data further includes data representative of a height of the first rotatable element.

11. A system as claimed in claim 9, wherein said first set of measured data further includes data representative of a diameter of the first rotatable element.

12. A system as claimed in claim 9, wherein said first set of measured data further includes data representative of a face surface of the first rotatable element.

13. A system for use in assembling a plurality of modules, each module including a plurality of rotatable elements in the assembly of a turbine engine, said system comprising:

module assembly means comprising:

initialization means for entering initialization data into a database, said initialization data including a first set of initialization data that includes data that is representative of a face surface of a first rotatable element, and a second set of initialization data that is representative of a face surface of a second rotatable element;

measurement means for permitting a user to enter measured data including a first set of measured data that includes data that is representative of a measured face surface of the first rotatable element, and a second set of measured data that includes data that is representative of a measured face surface of the second rotatable element; and processor means for determining an optimal rotational arrangement of the first and second rotatable elements with respect to one another responsive to said first and second sets of initialization data and said first and second sets of measured data;

module-to-module assembly means comprising:

verification means for verifying measured face surface characteristics of at least two assembled modules; and assembly parameter means for assembling the at least two modules of the turbine engine.

14. A system as claimed in claim 13, wherein said first set of measured data further includes data representative of a height of the first rotatable element.

15. A system as claimed in claim 13, wherein said first set of measured data further includes data representative of a diameter of the first rotatable element.

16. A system as claimed in claim 13, wherein said first set of measured data further includes data representative of a radius of the first rotatable element.

17. A system as claimed in claim 1, wherein said measurement means includes at least one probe that is positioned at a known angular position with respect to a starting position of rotation of the first rotatable element.

18. A system as claimed in claim 1, wherein said first set of measured data includes data that is representative of an angular position of the first rotatable element with respect to a starting position.

19. A system as claimed in claim 5, wherein said measurement means includes at least one probe that is positioned at a known angular position with respect to a starting position of rotation of the first rotatable element.

20. A system as claimed in claim 5, wherein said first set of measured data includes data that is representative of an angular position of the first rotatable element with respect to a starting position.

21. A system as claimed in claim 13, wherein said measurement means includes at least one probe that is positioned at a known angular position with respect to a starting position of rotation of the first rotatable element.

22. A system as claimed in claim 1, wherein a module is a low pressure compressor module, a high pressure compressor module, a high pressure turbine, or a low pressure turbine.

23. A system as claimed in claim 5, wherein a module is a low pressure compressor module, a high pressure compressor module, a high pressure turbine, or a low pressure turbine.

24. A system as claimed in claim 9, wherein a module is a low pressure compressor module, a high pressure compressor module, a high pressure turbine, or a low pressure turbine.

25. A system as claimed in claim 13, wherein a module is a low pressure compressor module, a high pressure compressor module, a high pressure turbine, or a low pressure turbine.

* * * * *

UNITED STATES PATENT AND TRADEMARK OFFICE

CERTIFICATE OF CORRECTION

PATENT NO. : 6,898,547 B1
DATED : May 24, 2005
INVENTOR(S) : J. Holly DeBlois and Robert M. Lee It is certified that error appears in the above-identified patent and that said Letters Patent is hereby corrected as shown below:

Column 5,
Line 20, replace “each module including a plurality of rotatable elements” with -- each module including a plurality of rotatable elements, --.
Lines 57-58, delete “modules, each module including a plurality of rotatable elements” and insert -- rotatable elements, --.

Column 6,
Line 29, replace “each module including a plurality of rotatable elements” with -- each module including a plurality of rotatable elements, --.

Column 7,
Line 2, replace “each module including a plurality of rotatable elements” with -- each module including a plurality of rotatable elements, --.

Signed and Sealed this

Seventeenth Day of January, 2006

JON W. DUDAS
*Director of the United States Patent and Trademark Office*